Jan. 15, 1952     W. P. OEHLER     2,582,503
COVERING MEANS FOR PLANTING ATTACHMENTS
Original Filed Feb. 9, 1948
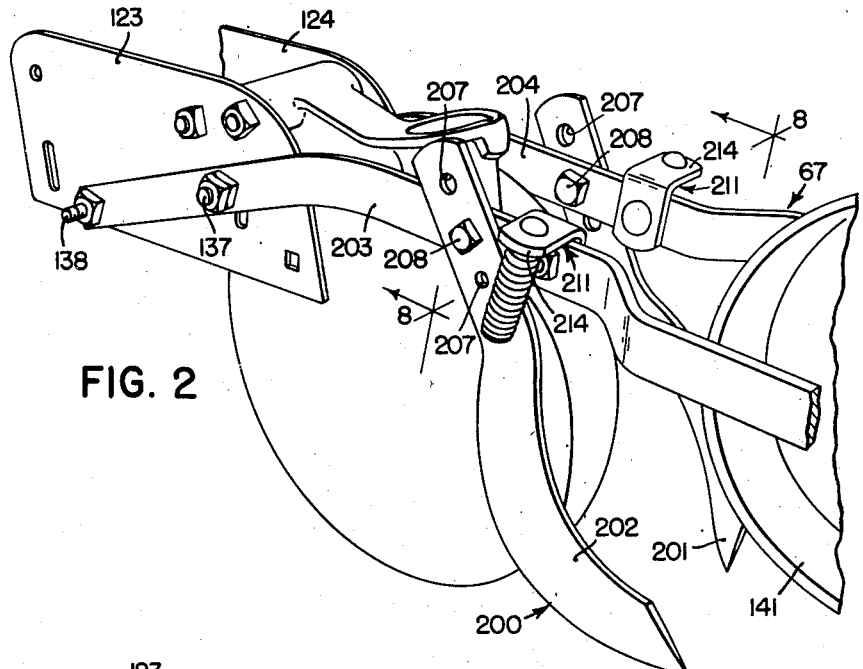
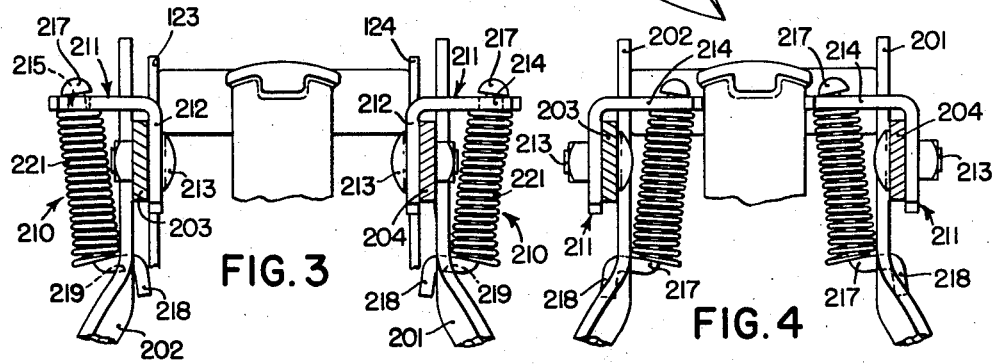
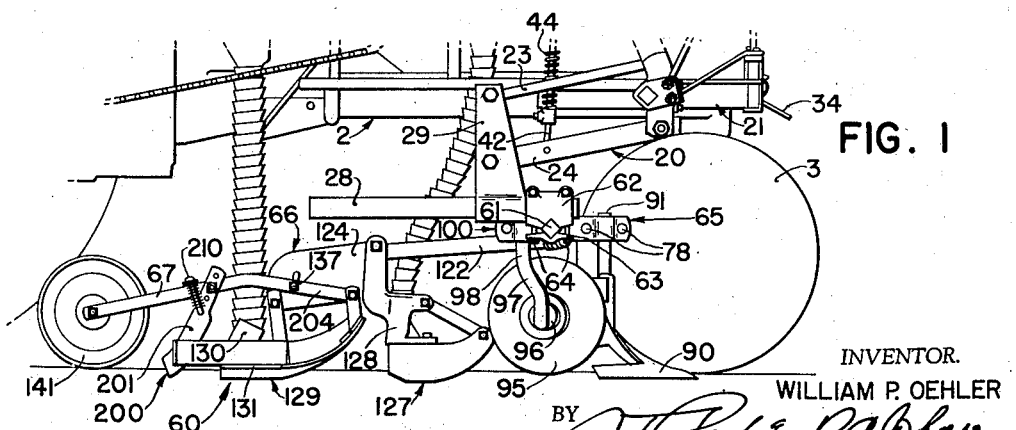
INVENTOR.
WILLIAM P. OEHLER Patented Jan. 15, 1952

2,582,503

UNITED STATES PATENT OFFICE 2,582,503

COVERING MEANS FOR PLANTING ATTACHMENTS

William P. Oehler, Moline, Ill., assignor to Deere & Company, Moline, Ill., a corporation of Illinois Original application February 9, 1948, Serial No. 7,042. Divided and this application July 23, 1949, Serial No. 106,351

4 Claims. (Cl. 97—56)

This is a division of my co-pending application, Serial No. 7,042, filed February 9, 1948.

The present invention relates generally to agricultural implements and more particularly to planting tools, especially tools of the type that are adapted to be mounted upon a propelling tractor.

The object and general nature of the present invention is the provision of a new and improved planting and fertilizer attachment. More particularly stated, it is a feature of this invention to provide a planting and fertilizer attachment in which is incorporated new and improved covering means, especially adapted for use with a planting and fertilizing attachment of the convertible type, and in which adjustment of the covering elements may readily be made.

These and other objects and advantages of the present invention will be apparent to those skilled in the art after a consideration of the following detailed description, taken in conjunction with the accompanying drawings, in which:

Figure 1 is a fragmentary side view showing a planting and fertilizing attachment for tractors in which the principles of the present invention have been incorporated.

Figure 2 is a fragmentary perspective view of the new and improved mounting for the knife coverers of the planting and fertilizing attachment.

Figure 3 is a view taken generally along the line 8—8 of Figure 2.

Figure 4 is a view similar to Figure 3 but showing the knife coverer members in their optional or narrow setting.

Referring now to the drawings. particularly Figure 1, the tractor on which the new and improved planting and fertilizer attachments are mounted is indicated in its entirety by the reference numeral 1 and is of the well known three-wheel or tricycle type, including a narrow body 2, front wheel means 3 and laterally spaced rear or traction wheels 4 fixed to axles 5 that are journaled for rotation in rear axle extensions 6. However, the planter and fertilizer attachments of the present invention are also applicable to other tractors, such as the one-row type. The tractor 1 preferably includes a power lift unit which is connected with the tractor motor so as to be driven therefrom and arranged to act through lifting mechanism for raising and lowering planting and fertilizing attachments as well as other tools connected with the tractor. The tractor and its power lift raising and lowering mechanism are conventional so far as the present invention is concerned.

According to the principles of the present invention, my new and improved planting and fertilizer attachment is constructed and arranged to be mounted on the rig beams of an integral or tractor-mounted cultivator, especially one of the type shown in the United States Patent No. 2,423,148, issued to Theodore W. Johnson, July 1, 1947, although it is to be understood that the planting and fertilizer attachment of the present invention may readily be mounted on the rig beams of other types of tractor-mounted cultivators or on other supports, as desired.

The planting and fertilizer attachment in which the principles of the present invention have been incorporated as shown in Figure 1 is carried by portions of a tractor-mounted cultivator, indicated in its entirety by the reference numeral 20. The latter includes an attaching frame 22 at each side of which two pairs of vertically spaced links 23 and 24 are connected for generally vertical swinging movement. The tractor cultivator also includes a pair of rig beams 28 at each side of the tractor, each having a generally upwardly extending bracket 29 to which the rear ends of the associated links 23 and 24 are pivotally connected. The rig beams 28 are raised and lowered by suitable connections from the tractor power lift unit to the lower links 24, represented by a lifting rod 42 pivotally connected at its lower end with the associated link 24.

The planting and fertilizer unit is indicated in its entirety by the reference numeral 60, there being one of such units at each side of the tractor 1 and each unit is supported on a crossbar 61 that is fixed to the two rig beams 28 at each side of the tractor. To this end, the forward end of each of the rig beams 28 carries a clamping member 62, and preferably the latter member is disposed immediately ahead of the associated rig beam bracket 29. Each clamping member 62 is provided with a clamping cap section 63 and clamping bolts 64 receiving the associated end of the supporting bar 61 for the planting and fertilizer unit 60. Essentially, each of the planting and fertilizer attachments 60 comprises a forward tool clamp unit 65 carried by the supporting bar 61 and a furrow opener frame unit 66 swingably connected with the bar 61. A press wheel unit 67 is fixed adjustably to the rear end of the furrow opener frame unit 66, although if desired the press wheel unit 67 may be floatingly connected.

A front shovel 90 is disposed at the forward end of the tool clamp 65 and has its shank 91 disposed in the forward shank-receiving socket of the unit 65, the shank being firmly held in position by the forward clamping bolts 78. This disposes the shank 91 forward of the supporting bar 61. Also, in this arrangement a pair of hilling disks 95 are disposed rearwardly of the supporting bar 61, each hilling disk being set to turn the soil inwardly to form a hill. Each hilling disk 95 is journaled for rotation on suitable bearing means 96 fastened at the lower or rearwardly offset end portion 97 of a hilling disk shank member 98, the upper end of which is disposed rearwardly of the associated supporting bar 61 and firmly secured thereto by a tool clamp unit indicated in its entirety by the reference numeral 100.

The furrow opener frame unit 66 comprises a pair of laterally spaced strap members 122 that are fixed at their rear ends, as by welding, to a pair of laterally spaced plate sections 123 and 124, the forward edges of the plate sections being rigidly interconnected by a cross plate (not shown). The plate sections 123 and 124 are provided with various apertures so as to accommodate the attachment of various tools thereto, such as a forwardly disposed fertilizer opener unit 127 having a fertilizer spout 128 and a rearwardly disposed seed furrow opener unit 129 having a seed receiving spout section 130. The unit 129 may also carry gauge shoes 131, if desired, and as mentioned above, a press wheel unit 67 is also adapted to be attached to the furrow opener frame unit 66 through the attaching bracket plate sections 123 and 124. The press wheel unit 67 comprises a pair of laterally spaced bars 203 and 204 apertured at their forward ends to receive clamping bolts 137 and 138 and spaced apart at their rear ends to receive a pair of press wheels 141. The press wheel unit 67 also includes knife covering members with which the present invention is particularly concerned.

In order to assure proper filling of the fertilizer and seed furrows opened by the units 127 and 129 covering means, indicated in its entirety by the reference numeral 200, is provided. Referring now more particularly to Figures 2, 3 and 4, the covering means 200, according to the principles of the present invention, includes a pair of knife covering members 201 and 202 pivotally mounted on a pair of bars 203 and 204, respectively, which comprise the press wheel frame of the unit 67. The forward ends of the press wheel frame bars 203 and 204 are apertured so as to be pivotally mounted on the attaching bolts 138, and the rear bolts 137 may be employed for fixing the bars 203 and 204 to the bracket plates 123 and 124 where it is desired to fix the unit 67 rigidly to the furrow opener unit 66. Each knife coverer member is provided at its upper end with a plurality of apertures 207 in any one of which a pivot bolt 208 may be disposed, the latter being carried by the associated press wheel frame bar. As best shown in Figure 1, where the attachment is provided with a fertilizer furrow opener unit 127 and the same is mounted, for example, on the laterally outer side of the frame unit 66, the laterally outer knife coverer member 201 is disposed on the laterally outer side of the press wheel frame bar 204. The laterally inner knife covering member 202 may be mounted on the laterally inner side of the associated press wheel frame bar 204 (see left hand portion of Figure 4), or both knife coverer members may be disposed on the laterally outer sides of the associated press wheel frame members 203 and 204.

Referring again to Figure 3, each of the knife coverer members 201 and 202 is urged downwardly by spring means which is indicated in its entirety by the reference numeral 210. Each spring means includes an angle bracket 211 having an attaching section 212 apertured to receive a fastening bolt 213. The other section 214 of the bracket 211 is apertured, at 215, to receive the headed end of a rod 217, the other end of which is formed as a hook section 218 and disposable in an opening 219 in the associated knife coverer member. A spring 221 is disposed about each rod 217 and at its upper end bears against the section 214 of the associated bracket 211 and at its lower end bears against the associated knife coverer member through contact with the hook portion at the lower end of the rod 217.

As best shown in Figure 3, each knife coverer and associated spring means are arranged so that the knife coverer may be disposed optionally on either the inner or the outer side of the associated press wheel frame bar. For example, as illustrated, when the knife coverer member 201 is disposed on the outer side of the press wheel frame bar 203, the spring bracket 211 is fastened on the inside of the frame bar 203 and the spring-receiving section 214 thereof extended laterally outwardly over the edge of the bar 203. If the knife coverer member is to be mounted on the inside of the associated press wheel frame bar, the spring bracket 211 is fastened on the outer side of the press wheel frame bar and the spring-receiving section 214 thereof directed laterally inwardly so as to dispose the rod 217 and spring 221 in the proper position to act effectively against the knife coverer member. Where the fertilizer furrow opener is eliminated, it is preferable to have both knife coverers on the laterally inner sides of the associated press wheel frame bars, but when the fertilizer furrow openers are attached, either at one side or the other of the furrow opener frame, the knife coverer at that side of the attachment is preferably disposed at the outer side of the associated press wheel frame bar. The above described spring mounting and associated parts permit a ready change in the positions of the knife coverer members so that the coverer element at the side of the unit where the fertilizer furrow opener is disposed is placed in such position as to move a quantity of soil sufficient to cover adequately the fertilizer in the fertilizer furrow opener as well as at least a portion of the seed furrow, the other coverer member being preferably disposed on the laterally inner side of the associated press wheel frame bar so as to pull in just enough soil to complete the filling or covering of the seed furrow.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a planter or the like having a frame including a pair of laterally spaced bars, a covering member pivotally connected to each bar and reversible between a position at the inner side of the associated bar and a position at the outer side thereof, a spring-receiving bracket for each covering member and attachable to the associated bar optionally at the outer side or inner side thereof, respectively, and a spring acting between each bracket and the associated pivoted covering member.

2. In a planter or the like having a frame including a pair of laterally spaced bars, a covering member pivotally connected to each bar and reversible between a position at the inner side of the associated bar and a position at the outer side thereof, a spring-receiving bracket for each covering member and including an attaching section attachable to the associated bar optionally at the outer side or inner side thereof, and a spring-receiving section extending substantially at a right angle to said attaching section and adapted to extend across the bar to the side thereof opposite the side at which said attaching section is connected to the bar, being thereby disposed at the same side of the associated frame bar as the associated covering member, each bracket being attachable to the associated bar optionally at the outer side or inner side thereof according to whether the associated covering member is disposed at the inner or outer side, respectively, of the associated frame bar, and a spring acting between the spring-receiving section of the associated bracket and the covering member in either of their optional positions on the associated frame bar.

3. For use with a planter or the like having a frame including a pair of laterally spaced bars, and a covering member pivotally connected to each bar and reversible between a position at the inner side of the associated bar and a position at the outer side thereof, the improvement comprising a spring-receiving bracket for each covering member, each bracket including an attaching portion and laterally extending spring-receiving portion adapted to extend from one side of the associated frame bar, across said bar and beyond the other side thereof, means for connecting the attaching portion of each bracket to the associated bar optionally at the outer side or inner side thereof, according to the position of the associated covering member, and spring means acting between the outer end of the laterally extending portion of each bracket and the associated covering member.

4. For use with a planter or the like having a frame including a pair of laterally spaced bars, the improvement comprising a covering member pivotally connected to each bar and reversible between a position at the inner side of the associated bar and a position at the outer side thereof, a spring-receiving bracket for each covering member and attachable to the associated bar optionally at the outer side or inner side thereof, respectively, and spring means acting between each bracket and the associated pivoted covering member, each spring means including a spring acting at one end against the associated bracket, and a member having a portion interengageable with the associated covering member from either side and receiving the other end of the associated spring.

WILLIAM P. OEHLER.

REFERENCES CITED

The following references are of record in the file of this patent:

UNITED STATES PATENTS

| Number | Name | Date |
|---|---|---|
| 721,306 | Hutcherson | Feb. 24, 1903 |
| 734,150 | Wilson | July 21, 1903 |
| 941,298 | Baxter | Nov. 23, 1909 |